March 21, 1950      R. M. STRONG      2,501,360
CONTROL SYSTEM FOR DIESEL-ELECTRIC LOCOMOTIVES
Filed April 23, 1948
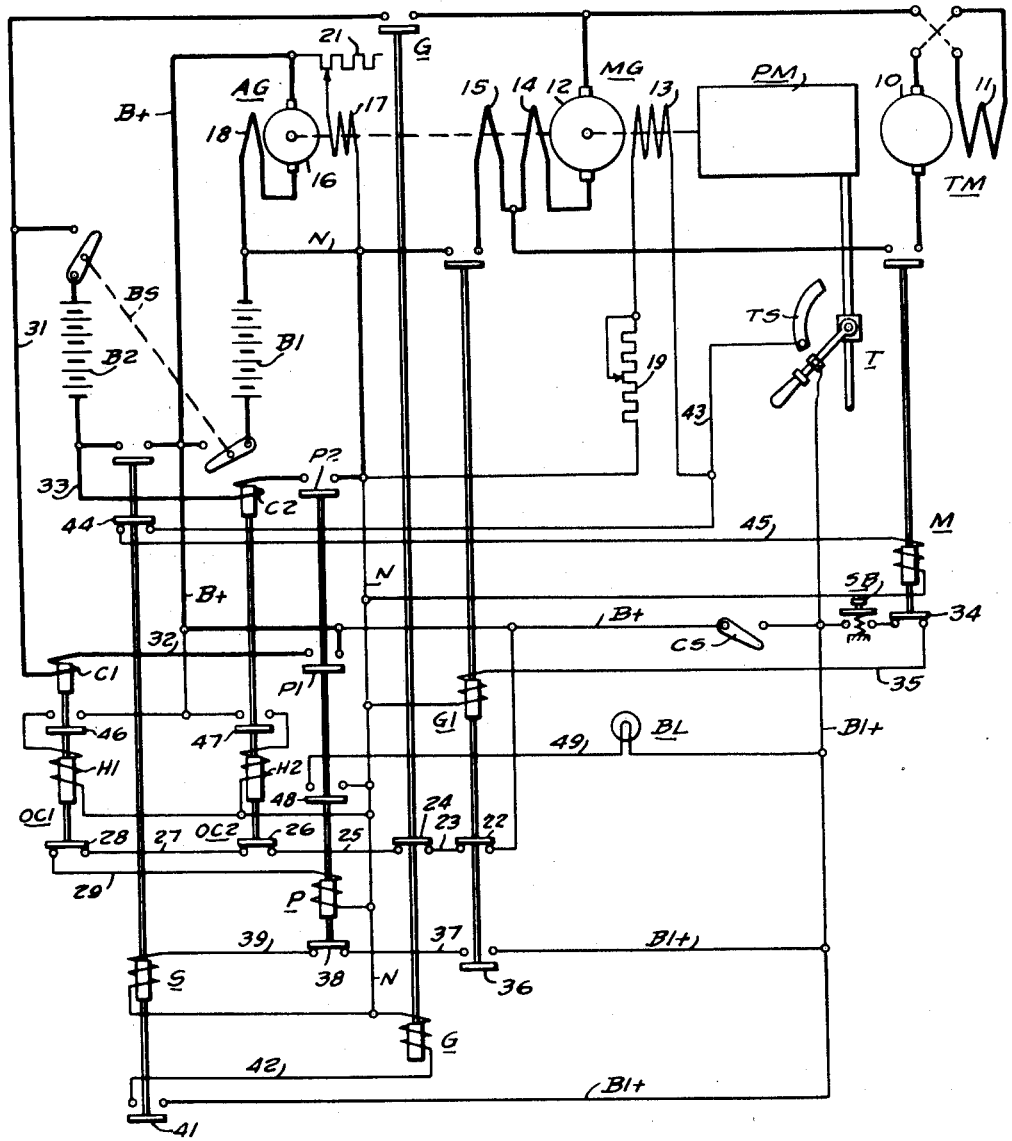
WITNESSES:
INVENTOR
Robert M. Strong.
BY
ATTORNEY Patented Mar. 21, 1950

2,501,360

UNITED STATES PATENT OFFICE 2,501,360

CONTROL SYSTEM FOR DIESEL-ELECTRIC LOCOMOTIVES

Robert M. Strong, Pittsburgh, Pa., assignor to Westinghouse Electric Corporation, East Pittsburgh, Pa., a corporation of Pennsylvania Application April 23, 1948, Serial No. 22,857

7 Claims. (Cl. 290—10)

My invention relates, generally, to locomotive control systems, and more particularly, to a system for starting and controlling the operation of a Diesel-electric locomotive, or the like.

One method of starting a Diesel-electric locomotive is to crank the engine by means of the main generator which may be provided with a special winding for starting. The generator is operated as a series motor on power from the locomotive battery. Some of the engines commonly used can be started from a 16-cell storage battery. Others require a higher voltage battery in order to reach the firing speed.

In order that standard apparatus may be utilized for controlling locomotives of different types, it is necessary to design the control apparatus for the lowest voltage expected. This equipment can be utilized on locomotives requiring a higher battery voltage by using two 16-cell batteries connected in parallel-circuit relation. For starting the engines the two batteries are connected in series-circuit relation, thereby providing ample voltage for cranking most engines.

An object of my invention, generally stated, is to provide a locomotive starting system which shall be simple and efficient in operation and which may be economically manufactured and installed.

A more specific object of my invention is to provide for automatically switching the batteries on a locomotive from the normal parallel connection to the series connection for starting and then back to the parallel connection for charging.

Another object of my invention is to prevent applying power to the traction motors and attempting to crank the engine at the same time.

A further object of my invention is to protect the batteries against excessive circulating currents.

Still another object of my invention is to provide an indication of the operation of the battery protecting means.

Other objects of my invention will be explained fully hereinafter or will be apparent to those skilled in the art.

In accordance with one embodiment of my invention, the engine of a Diesel-electric locomotive may be cranked by closing a push-button switch which causes switches to be operated to connect the batteries in series-circuit relation and then apply power to the generator to crank the engine. When the engine fires, the push-button switch is released and the generator is disconnected from the batteries which are then reconnected in parallel-circuit relation. The sequence of operation of the switches is controlled by interlocks actuated by the switches.

For a better understanding of the nature and objects of my invention, reference may be had to the following detailed description, taken in conjunction with the accompanying drawing in which the single figure is a diagrammatic view of a control system embodying the principal features of my invention.

Referring to the drawing, the system shown therein comprises a traction motor TM, a main generator MG for supplying power to the traction motor, an auxiliary generator AG, and a prime mover PM for driving the main and the auxiliary generators. The prime mover PM may be a Diesel engine having a throttle controller T for controlling the supply of fuel to the engine. The traction motor TM is preferably of the series type having an armature winding 10 and a series field winding 11. The main generator MG may have an armature winding 12, a separately excited field winding 13, a commutating winding 14 and a starting winding 15.

The auxiliary generator AG has an armature winding 16, a shunt field winding 17, and a commutating winding 18. A variable resistor or rheostat 19 may be provided for adjusting the excitation current in the field winding 13 of the main generator. Likewise a variable resistor 21 may be provided for adjusting the current in the shunt field winding 17 of the auxiliary generator.

As explained hereinbefore, the main generator MG may be utilized for cranking the engine PM. Two batteries B1 and B2 are provided for supplying power for cranking the engine, for operating the control apparatus and also supplying the excitation current for the main generator. The batteries B1 and B2 are normally connected in parallel-circuit relation by a two-pole electrically operated switch P. The parallel connected batteries are connected across the auxiliary generator AG for charging the batteries. The batteries may be connected in series-circuit relation by an electrically operated switch S to supply a higher voltage for cranking the engine. The batteries may be disconnected from the power system by a two-pole manually operable switch BS. A manually operable switch CS is provided for disconnecting the batteries from the control apparatus.

In addition to the foregoing apparatus, electrically operated switches G and G1 are provided for connecting the batteries to the main generator MG for cranking the engine. A switch M is provided for connecting the main generator to the traction motor TM. A manually operable push-button switch SB is provided for initiating the operation of the switches which control the cranking operation.

In order that the functioning of the apparatus may be more clearly understood, the operation of the system will now be described in more detail. Assuming that the switches BS and CS are closed, the switch P is normally closed to connect the batteries B1 and B2 in parallel-circuit relation and across the auxiliary generator AG. The energizing circuit for the actuating coil of the switch P may be traced from a positive conductor B+ through an interlock 22 on the switch G1, conductor 23, interlock 24 on the switch G, conductor 25, contact members 26 on an over-current relay OC2, conductor 27, contact members 28 on an over-current relay OC1, conductor 29 and the actuating coil of the switch P to a negative conductor N.

The closing of switch P connects the battery B2 in parallel-circuit relation with the battery B1. The positive connections for the batteries may be traced from the positive terminal of the battery B2 through the switch BS, conductor 31, a closing coil C1 of the relay OC1, conductor 32, contact members P1 of the switch P, conductor B+ and the switch BS to the positive terminal of the battery B1. The negative connections for the batteries extend from the negative terminal of the battery B2 through conductor 33, a closing coil C2 for the relay OC2, contact members P2 of the switch P, and the negative conductor N to the negative terminal of the battery B1. As shown, the positive conductor B+ and the negative conductor N are connected across the armature terminals of the auxiliary generator AG. Therefore the batteries are charged by the auxiliary generator during normal operation.

The engine PM may be cranked by closing the starting push-button SB, thereby causing the switch G1 to be closed, the switch P to be opened to open the parallel connections for the batteries, the switch S to be closed to connect the batteries in series and the switch G to be closed to complete the connecting of the batteries across the generator MG to crank the engine. The foregoing sequence of operation of the switches is controlled by interlocks actuated by the switches.

The energizing circuit for the actuating coil of the switch G1 may be traced from the positive conductor B+ through the switch CS, conductor B1+, the push-button switch SB, an interlock 34 on the switch M, conductor 35 and the actuating coil of the switch G1 to the negative conductor N. The closing of the switch G1 opens its interlock 22 to interrupt the energizing circuit for the actuating coil of the switch P, thereby opening this switch.

The opening of the switch P establishes an energizing circuit for the actuating coil of the switch S which extends from the conductor B1+ through an interlock 36 on the switch G1, conductor 37, an interlock 38 on the switch P, conductor 39 and the actuating coil of the switch S to the negative conductor N. The closing of switch S establishes an energizing circuit for the actuating coil of the switch G which extends from the conductor B1+ through an interlock 41 on the switch S, conductor 42 and the actuating coil of the switch G to the negative conductor N. In this manner the batteries are connected in series-circuit relation across the main generator MG, thereby cranking the engine.

When the engine fires, the starting button SB is released, thereby interrupting the energizing circuit for the coil of the switch G1, causing this switch to open. The opening of the interlock 36 on the switch G1 interrupts the energizing circuit for the coil of the switch S, causing this switch to open. The opening of the interlock 41 on the switch S interrupts the energizing circuit for the coil of switch G, causing this switch to open. The closing of the interlocks 22 and 24 on the switches G1 and G, respectively, establishes the energizing circuit for the switch P, thereby closing this switch to re-connect the batteries B1 and B2 in parallel-circuit relation across the auxiliary generator AG for charging.

From the foregoing description, it will be seen that by merely pushing the starting button SB, the batteries are switched from a parallel connection to a series connection for cranking the engine, and by releasing the same button the batteries are returned to the parallel connection for charging. Since the sequence of operation of the switches is controlled by interlocking members actuated by the switches, the failure of one of the switches to operate properly will stop the sequence and prevent the switches S and P from being closed at the same time.

When the engine is running, the generator MG may be connected to the traction motor TM by operating a throttle switch TS to establish an energizing circuit for the actuating coil of the switch M. This circuit may be traced from the conductor B1+ through the throttle switch TS, conductor 43, an interlock 44 on the switch S, conductor 45 and the actuating coil of the switch M to the negative conductor N. The interlocks 44 on the switch S and 34 on the switch M prevent the simultaneous connection of the batteries and the traction motor to the generator, thereby preventing the applying of power to the traction motor while attempting to crank the engine.

The over-current relays OC1 and OC2 are provided for preventing an excessive amount of current from circulating through the batteries as a result of a faulty condition of the batteries. As explained hereinbefore, the closing coils C1 and C2 of the over-current relays OC1 and OC2, respectively, are disposed in the parallel-circuit connections for the batteries. When the current through these coils exceeds a predetermined amount, the relays are actuated to open their contact members 26 and 28, which interrupts the energizing circuits for the switch P, thereby causing the parallel connections for the batteries to be opened.

The over-current relay OC1 is provided with a holding coil H1 which is energized through an interlock 46 on the relay. Likewise, the relay OC2 is provided with a holding coil H2 which is energized through an interlock 47 on the relay. Once either one, or both, of these relays has been operated by an over-current, the battery switch BS must be opened to interrupt the circuit through the holding coil and reset the relays to restore the charging connections.

The opening of the switch P, as a result of the operation of either one or both of the over-current relays, opens an interlock 48 on the switch P thereby interrupting the energizing circuit for an indicating light BL which is normally connected across the batteries through a conductor 49 and the interlock 48. In this manner the operator of the locomotive is informed that the switch P has been opened and the batteries are not being charged by the auxiliary generator.

From the foregoing description, it is apparent that I have provided a relatively simple system for controlling the starting of the prime mover of a locomotive or other self-propelled vehicle. The system requires a minimum amount of attention on the part of the operator of the vehicle and is so constructed that the failure of any part of the control apparatus to function properly cannot result in damage to the battery or other equipment on the locomotive.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a motor, a generator for supplying power to the motor, an engine for driving the generator, a switch for connecting the motor to the generator, a plurality of batteries, switching means for connecting the batteries in either parallel or series-circuit relation, additional switches for connecting the batteries to the generator to crank the engine, manually operable means for initiating sequential operation of said switches, and interlocking means actuated by said switches and said switching means for controlling the sequential operation of said switches and said switching means first to change the batteries from parallel to series-circuit relation and then connect the batteries to the generator to crank the engine.

2. In a control system, in combination, a motor, a generator for supplying power to the motor, an engine for driving the generator, a switch for connecting the motor to the generator, a plurality of batteries, switching means for connecting the batteries in either parallel or series-circuit relation, additional switches for connecting the batteries to the generator to crank the engine, manually operable means for initiating sequential operation of said switches, interlocking means for controlling the sequential operation of said switches and said switching means first to change the batteries from parallel to series-circuit relation and then connect the batteries to the generator to crank the engine, and additional interlocking means for preventing the simultaneous connection of the motor and the batteries to the generator.

3. In a control system, in combination, a motor, a generator for supplying power to the motor, an engine for driving the generator, a switch for connecting the motor to the generator, a plurality of batteries, switching means for connecting the batteries in either parallel or series-circuit relation, additional switches for connecting the batteries to the generator to crank the engine, manually operable means for initiating sequential operation of said switches, interlocking means actuated by said switches and said switching means for controlling the sequential operation of said switches and said switching means first to change the batteries from parallel to series-circuit relation and then connect the batteries to the generator to crank the engine, and additional interlocking means actuated by said switches and said switching means for preventing the simultaneous connection of the motor and the batteries to the generator.

4. In a control system, in combination, a motor, a generator for supplying power to the motor, an engine for driving the generator, a switch for connecting the motor to the generator, a plurality of batteries, switching means for connecting the batteries in either parallel or series-circuit relation, additional switches for connecting the batteries to the generator to crank the engine, manually closable means for initiating sequential operation of said switches and said switching means, interlocking means for controlling the sequential operation of said switches and said switching means first to change the batteries from parallel to series-circuit relation and then to connect the series-connected batteries to the generator to crank the engine, said interlocking means so controlling the operation of said switching means that said batteries are disconnected from the generator and connected in parallel-circuit relation when said manually closable means is opened, and additional interlocking means for preventing the simultaneous connection of the motor and the batteries to the generator.

5. In a control system, in combination, a motor, a generator for supplying power to the motor, an engine for driving the generator, a switch for connecting the motor to the generator, a plurality of batteries, switching means for connecting the batteries in either parallel or series-circuit relation, additional switches for connecting the batteries to the generator to crank the engine, manually closable means for initiating sequential operation of said switches and said switching means interlocking means actuated by said switches and said switching means for controlling their sequential operation first to change the batteries from parallel to series-circuit relation and then to connect the series-connected batteries to the generator to crank the engine, said interlocking means so controlling the operation of said switches and said switching means that said batteries are disconnected from the generator and connected in parallel-circuit relation when said manually closable means is opened, and additional interlocking means actuated by said switches and said switching means for preventing the simultaneous connection of the motor and the batteries to the generator.

6. In a control system, in combination, a motor, a generator for supplying power to the motor, an engine for driving the generator, a switch for connecting the motor to the generator, a plurality of batteries, switching means for connecting the batteries in either parallel or series-circuit relation, additional switches for connecting the batteries to the generator to crank the engine, manually operable means for initiating sequential operation of said switches, interlocking means actuated by said switches and said switching means for controlling the sequential operation of said switches and said switching means first to change the batteries from parallel to series-circuit relation and then connect the batteries to the generator to crank the engine, and over-current relay means for causing the opening of the switching means for connecting the batteries in parallel-circuit relation.

7. In a control system, in combination, a motor, a generator for supplying power to the motor, an engine for driving the generator, a switch for connecting the motor to the generator, a plurality of batteries, switching means for connecting the batteries in either parallel or series-circuit relation, additional switches for connecting the batteries to the generator to crank the engine, manually operable means for initiating sequential operation of said switches, interlocking means actuated by said switches and said switching means for controlling the sequential operation of said switches and said switching means first to change the batteries from parallel to series-circuit relation and then connect the batteries to the generator to crank the engine, overcurrent relay means for causing the opening of the switching means for connecting the batteries in parallel-circuit relation, and signalling means responsive to the opening of the switching means for connecting the batteries in parallel-circuit relation.

ROBERT M. STRONG.

REFERENCES CITED

The following references are of record in the file of this patent:

UNITED STATES PATENTS

| Number | Name | Date |
|---|---|---|
| 1,115,154 | Apple | Oct. 27, 1914 |
| 1,118,616 | Apple | Nov. 24, 1914 |
| 1,142,791 | Apple | June 15, 1915 |
| 1,150,523 | Kettering | Aug. 17, 1915 |
| 1,171,055 | Kettering | Feb. 8, 1916 |
| 1,183,074 | Kettering | May 16, 1916 |
| 1,220,165 | Apple | Mar. 27, 1917 |
| 1,231,266 | Kettering | June 26, 1917 |
| 1,257,163 | Webster | Feb. 19, 1918 |
| 1,391,880 | Delano | Sept. 27, 1921 |
| 1,449,370 | Apple | Mar. 27, 1923 |
| 1,458,601 | Tanner | June 12, 1923 |
| 2,102,387 | Shapter | Dec. 14, 1937 |
| 2,292,203 | Cowin | Aug. 4, 1942 |
| 2,314,588 | Lillquist | Mar. 23, 1943 |
| 2,365,418 | Lillquist | Dec. 19, 1944 |
| 2,449,399 | Lillquist | Sept. 14, 1948 |